United States Patent [19]
Klein

[11] Patent Number: 6,038,819
[45] Date of Patent: *Mar. 21, 2000

[54] POWERED DRIVE ASSEMBLY

[75] Inventor: George W. Klein, Dearborn Heights, Mich.

[73] Assignee: ASC Incorporated, Southgate, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/906,139

[22] Filed: Aug. 5, 1997

[51] Int. Cl.$^7$ ...................................................... E05F 11/34
[52] U.S. Cl. .................................. 49/362; 49/123; 49/116
[58] Field of Search ............................. 49/360, 362, 118, 49/123, 116, 380, 352; 74/89.15, 424.8 R, 459

[56] References Cited

U.S. PATENT DOCUMENTS

| | | | |
|---|---|---|---|
| 4,852,422 | 8/1989 | Mori ...................................... | 49/362 X |
| 4,920,698 | 5/1990 | Friese et al. . | |
| 4,995,195 | 2/1991 | Olberding et al. ......................... | 49/118 |
| 5,018,783 | 5/1991 | Chamings et al. . | |
| 5,146,712 | 9/1992 | Hlavaty ..................................... | 49/118 |
| 5,154,482 | 10/1992 | Hayashi et al. . | |
| 5,542,214 | 8/1996 | Buening ................................. | 49/360 X |
| 5,613,323 | 3/1997 | Buening ................................. | 49/360 X |
| 5,669,181 | 9/1997 | Kollar et al. .............................. | 49/360 |
| 5,724,769 | 3/1998 | Cripe et al. ............................... | 49/360 |
| 5,787,636 | 8/1998 | Buchanan .................................. | 49/360 |
| 5,822,922 | 10/1998 | Grumm et al. ........................... | 49/360 |

FOREIGN PATENT DOCUMENTS

| | | | |
|---|---|---|---|
| 2809368 | 9/1979 | Germany ................................. | 49/352 |

OTHER PUBLICATIONS

C.R. Laurence Co., Inc., "CRL Truck Sliders", date unknown, pp. 19 and 25.

Powerslider Installation Instruction Sheet, Sep. 12, 1995.

Suhner catalog, "Flexible Shafts Spiral Bevel Gears", date unknown, pp. 33–34.

Suhner Transmission Expert catalog, "Miniature Flexible Shafts—A Small Part In Some Really Big Ideas", date unknown.

*Primary Examiner*—Jerry Redman
*Attorney, Agent, or Firm*—Harness, Dickey & Pierce, P.L.C.

[57] ABSTRACT

A powered drive assembly for positioning various slidable components within a vehicle interior. The powered drive assembly includes a motor assembly operably coupled to a flexible flocked drive cable which is supported for rotation within a housing. The flocked drive cable provides a helical surface. Specific coupling members are adapted to engage the helical surface and operably couple the drive cable with the slidable component. For example, in one preferred embodiment a coupling bracket operably couples the flocked drive cable to a slidable window assembly of the type used in the rear opening of a pick-up cab for opening and closing the window. In a second preferred embodiment, the coupling member operably couples the drive cable to a curtain assembly located within the interior of an over-the-road truck cab for opening and closing the curtain. The drive assembly further enables the motor assembly to be remotely located from the housing and coupling brackets, thereby facilitating in packaging of the powered drive assembly within the confines of the vehicle interior.

26 Claims, 6 Drawing Sheets

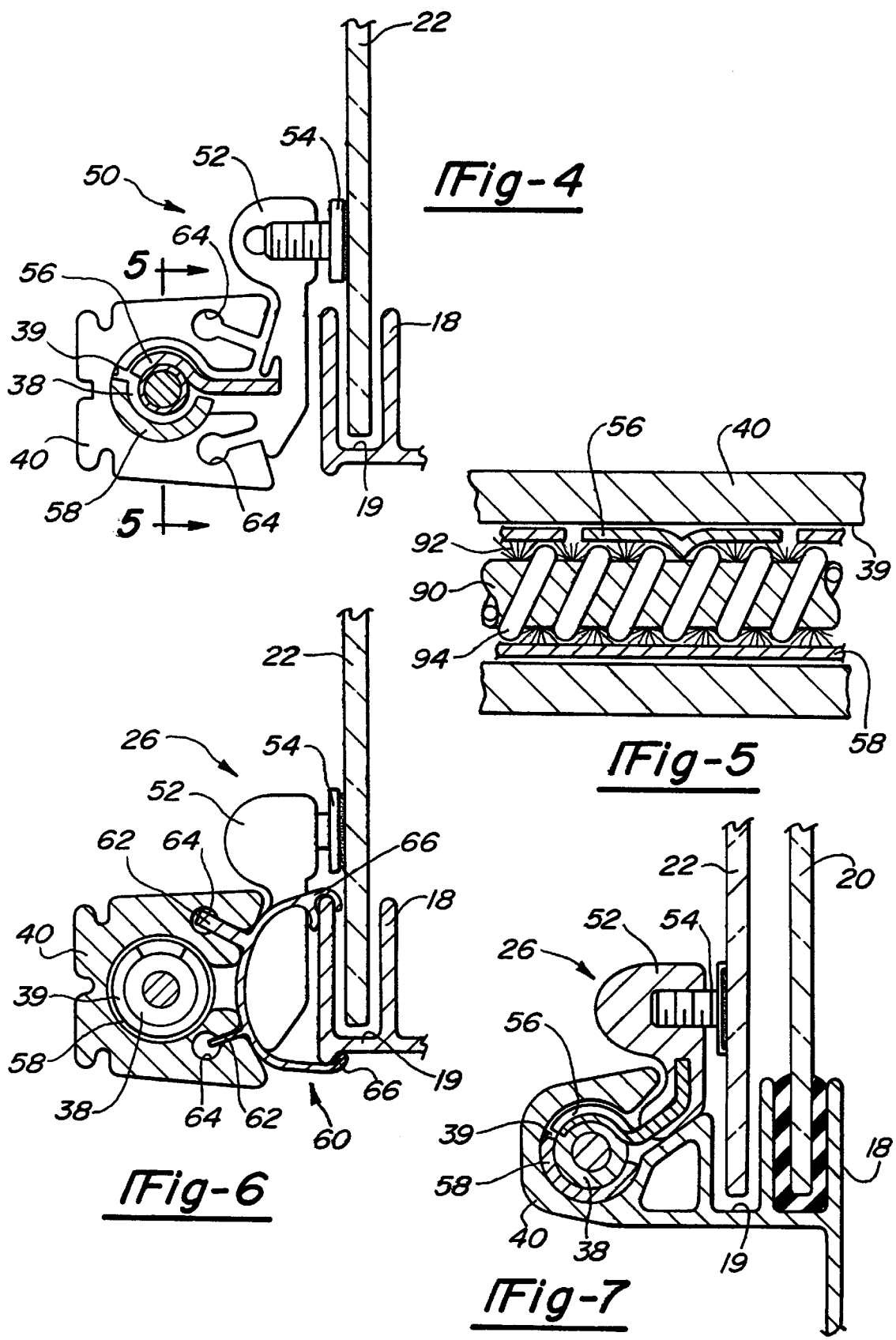

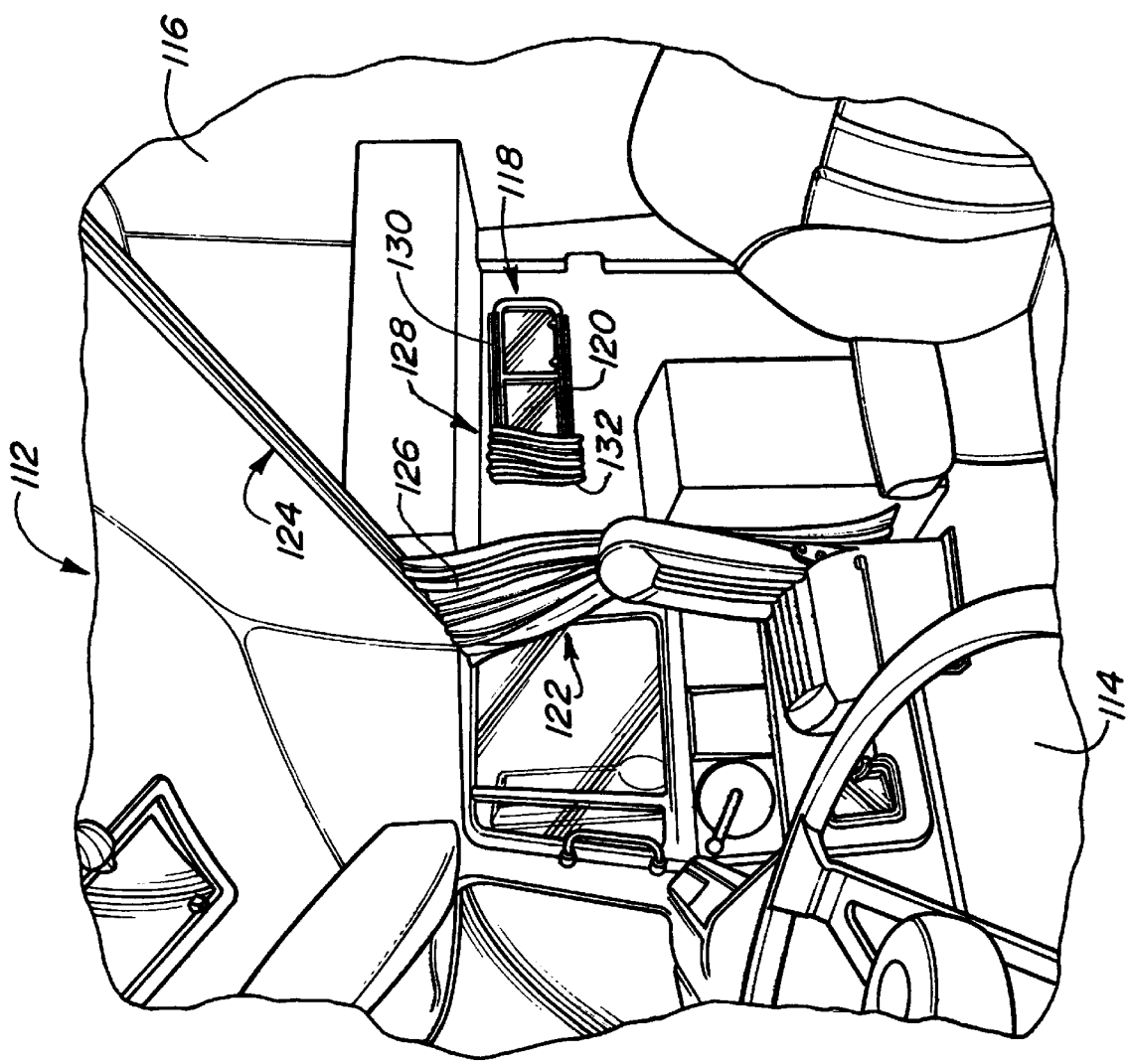

POWERED DRIVE ASSEMBLY

BACKGROUND AND SUMMARY OF THE INVENTION

This invention relates generally to a drive assembly for providing power assisted movement of various slidable components associated with a vehicle such as a rear window assembly of a truck cab or a curtain assembly within a vehicle interior.

Typically, truck cabs have a generally rectangular shaped window opening into which a rear window assembly is fitted. These window assemblies may include a single pane of glass which is immovable in the opening or alternatively multiple panes of glass, some of which are positionable to open and close a portion of the rear window assembly. While other types of positionable window assemblies are known, the most common is a sliding window assembly having a sliding pane which is typically operated manually, and therefore are difficult to open and close while driving the vehicle.

Likewise, vehicle interiors, such as a recreational vehicle or over-the-road truck, may include sliding window assemblies in the side of the vehicle similar to the rear window of a truck cab or may include various sliding curtain assemblies for covering a window assembly or partitioning the interior of the vehicle. As with the rear window assemblies in a truck cab previously described, these windows and/or curtains are typically operated manually, and therefore cannot be positioned remotely within the vehicle interior.

It is known to employ various electro-mechanical systems to provide power assist for vehicular components. As an example, powered windows are frequently employed for opening and closing the side glass in the door of a vehicle. In this type of powered window assembly, the side glass is vertically retracted within a portion of the vehicle body, and thus slides downwardly and upwardly within the window assembly. As such, these electro-mechanical systems are not readily adaptable to the transversely sliding components heretofore described. Moreover, it is difficult to package the electro-mechanical components of these systems within the proximate space constraints of the vehicle.

In a first preferred embodiment, the present invention is incorporated into a rear window assembly within a rear opening of a truck cab. The window assembly includes at least one movable window pane which is transversely positionable within a window frame to provide a window opening. In a second preferred embodiment, the present invention is utilized to provide power assisted manipulation of a curtain located within the interior of a recreational vehicle or over-the-road truck.

Accordingly it is an object of the present invention to provide a powered drive assembly for manipulating various slidable components associated with a vehicle.

It is another object of the present invention to provide a powered drive assembly in which the drive motor may be readily positioned at a remote location from the window assembly, thereby facilitating packaging thereof.

It is a further object of the present invention to provide a powered drive assembly which may be readily adapted and operably coupled to manually operated vehicle components for after market applications.

It is still another object of the present invention to provide a low-cost, powered rear window assembly for use with a rear window of a truck cab.

It is a further object of the present invention to provide a low-cost, powered drive assembly for use with a partition curtain located within the interior of a vehicle.

These and other advantages of the present invention will become apparent to those skilled in the art from the following written description and appended claims, taken in conjunction with the accompanying drawings.

BRIEF DESCRIPTION OF THE DRAWINGS

FIG. 4 is a cross sectional view of the track assembly, coupling bracket and the slidable window assembly taken along line 4—4 shown in FIG. 2;

FIG. 5 is a cross sectional view of the drive cable and coupling bracket;

FIG. 6 is a cross sectional view of the track assembly, coupling bracket and slidable window assembly taken along line 6—6 shown in FIG. 2;

FIG. 7 is a cross sectional view similar to that illustrated in FIG. 4 of an alternate embodiment in which the drive cable assembly is integrally formed with a portion of the frame for the rear window assembly;

FIG. 8 is a partial cut away view of the interior of an over-the-road truck sharing a variety of applications for the drive assembly of the present invention.

DETAILED DESCRIPTION OF THE PREFERRED EMBODIMENT

The present invention is directed to a powered drive assembly for positioning various slidable components within a vehicle interior such as a window pane associated with a rear window assembly of a truck vehicle or a curtain located within an over the road truck or recreational vehicle. While the preferred embodiments are described with specific reference to a dual sliding rear window assembly and a cab curtain, it will be readily appreciate that the present invention is not limited to these applications from the description set forth herein. As used herein the term left side refers to the driver side of the vehicle and the term right side refers to the passenger side of the vehicle.

Figure 1:
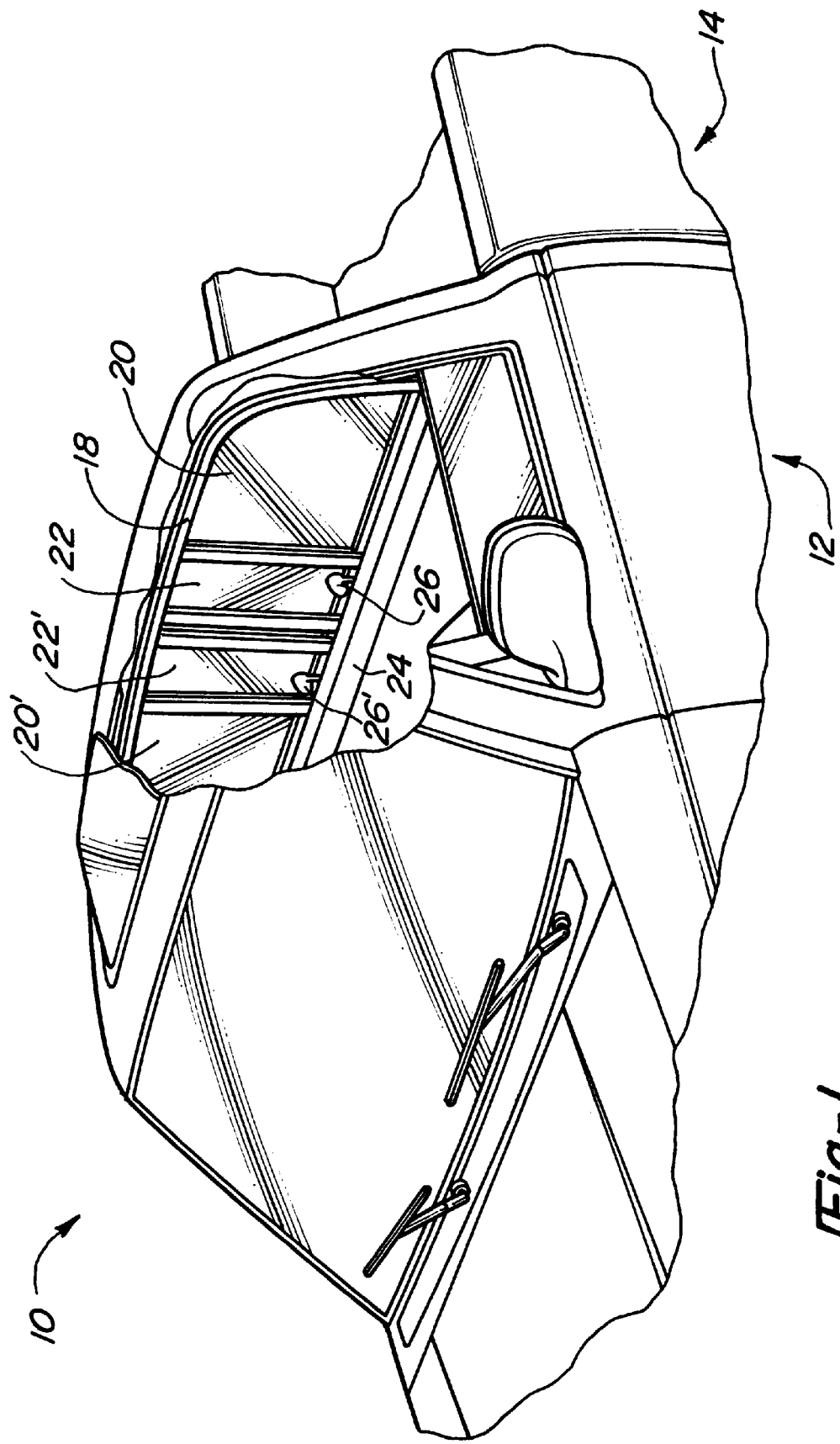
FIG. 1 is a cut away view of a portion of a pick-up truck showing the present invention in its environment.

Referring to FIG. 1, vehicle 10 is a pick-up truck having cab 12 and bed 14 extending therefrom. Rear window assembly 16 is positioned within an opening formed in the rear portion of cab 12 above bed 14. Rear window assembly 16 includes window frame 18 having track 19 formed therein, left and right fixed glass panes 20, 20' and left and right slidable glass panes 22, 22'. Slidable glass panes 22, 22' are slidably positionable in a direction parallel to track 19 formed in window frame 18 3. Rear window drive assembly 24 is secured to a lower portion of window frame 18 and operably coupled to slidable glass panes 22, 22' by coupling bracket 26, 26' for positioning thereof. As presently preferred, one coupling bracket is utilized on each slidable glass pane, however, multiple coupling brackets could be employed to provide multiple attachment points should misalignment of the glass pane during sliding movement misalignment present a problem.

Figure 2:
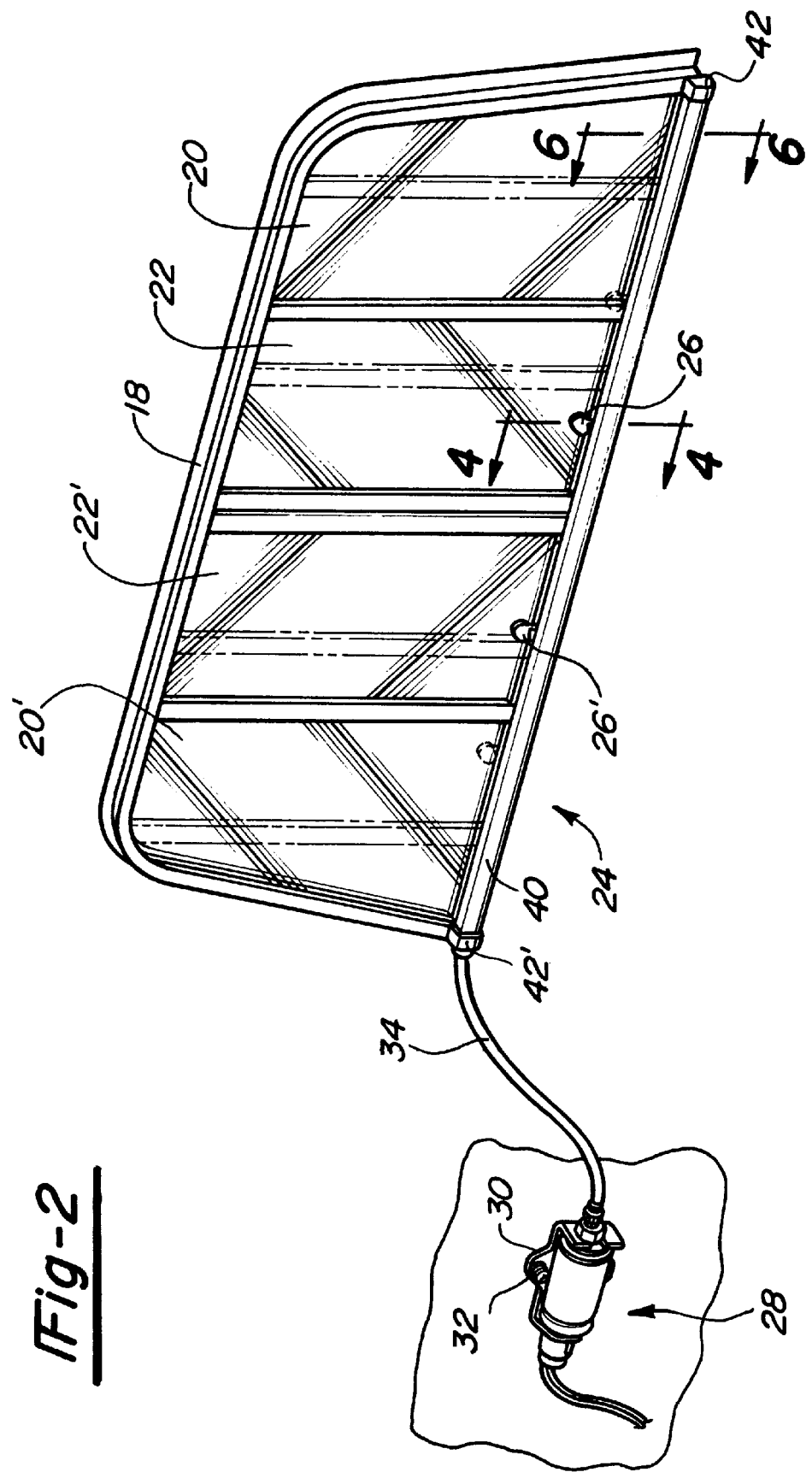
FIG. 2 is a perspective view showing the powered rear window assembly and the remotely located motor thereof.

Referring now to FIG. 2, drive motor assembly 28 is remotely located from rear window drive assembly 24 and secured to a portion of vehicle 10 by drive motor bracket 30 and threaded fasteners 32. Flocked drive cable 36 extends from drive motor assembly 28 and operably couples to and becomes an integral part of rear window drive assembly 24.

Figure 3:
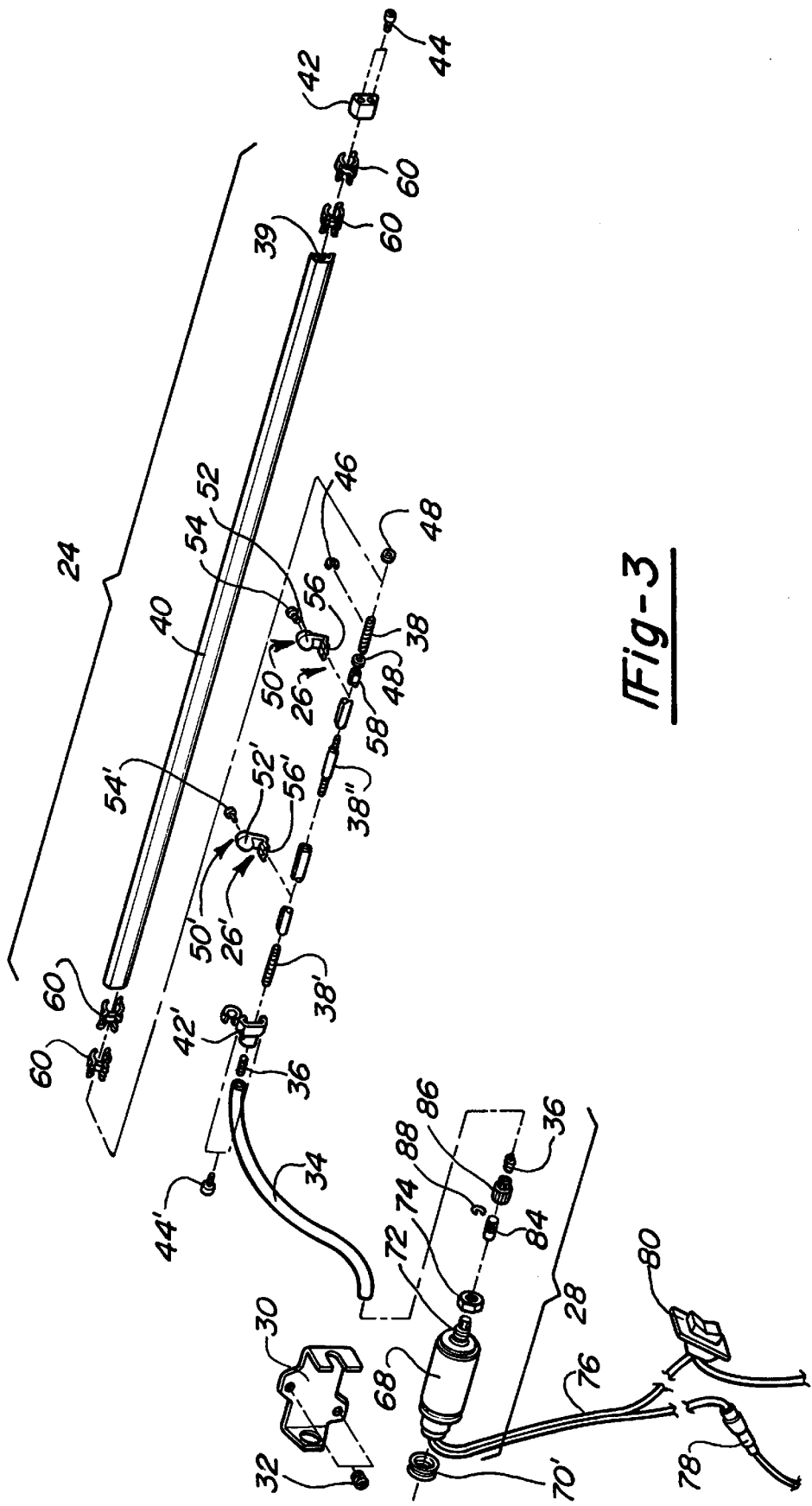
FIG. 3 is an exploded view of the present invention illustrated in FIG. 2.

Referring now to FIGS. 2 and 3, the details of rear window drive assembly 24 and drive motor assembly 28 are shown. More specifically, rear window drive assembly 24 includes a left hand threaded portion 38 and a right hand threaded portion 38' formed on flocked drive cable 36. Drive cable 36 is disposed within and supported by drive cable tube 34 and a longitudinal bore 39 formed along a longitudinal axis of housing 40 and supported therein for rotational movement. Molded end cap 42 is secured to a distal end of housing 40. Molded end cap 42' secures drive cable tube 34 to a proximal end of housing 40 and further supports drive cable 36 for rotation. Molded end caps 42, 42' are secured to housing 40 with threaded fasteners 44, 44'. Spring clip 46 is disposed on a distal end of drive cable 36 to retain its position within housing 40. A pair of thrust washers 48 are disposed adjacent spring clip 36 for appropriately positioning and axially loading drive cable 36 within housing 40.

Left coupling bracket 26 and right coupling bracket 26' are of the same design, such that further reference will be made only to left coupling bracket 26. Referring now to FIG. 4, coupling bracket 26 includes molded plastic coupling portion 50 having head 52 formed thereon and pad 54 extending from head 52 for engaging and securing coupling bracket 26 to slidable glass pane 22 with a suitable glass bonding agent. Coupling bracket 26 also includes metal bracket portion 56 embedded within coupling portion 50 and extending outwardly away from window frame 18 and slidable glass pane 22. Referring now to FIG. 5, drive cable 36 (not shown in cross section) is a flocked cable having a tightly coiled flexible inner core 90 fabricated from high strength steel, flocking 92 covers inner core 90, and an outer coil 94 fabricated from high strength steel wrapped over inner core 90 and flocking 92 to provide a helical surface having thread-like characteristics. A presently preferred flocked cable Is available from Suhner Manufacturing Inc. of Rome, Ga. and referred to as the SU-flex Control Shaft. As illustrated in FIG. 3, flocked drive cable 36 includes left hand thread portion 38 and right hand thread portion 38' joined at coupler portion 38". Coupler portion 38" is a tubular member which surrounds and frictionally engages left and right hand thread portions 38, 38' to sufficiently transfer torque therebetween. As can be seen in FIG. 5, bracket portion 56 has a contoured surface formed therein which fits into a space formed between adjacent wraps of outer coil 92 and engages outer coil 92 such that rotational movement of drive cable 36 is converted into linear translational movement of coupling bracket 26 to within housing 40. More specifically, bracket portion 56 is formed with generally V-shaped protuberance 57 which is complementary with the thread portion 38 of drive cable 36. In addition, bracket portion 56 is tangentially positionable within longitudinal bore 39 to accommodate varying tolerances between slidable window 20 and housing 40. Plastic spacer 58 is disposed within longitudinal bore 39 adjacent bracket portion 56 and to further support coupling bracket 26 on drive cable 36 and to prevent sagging of drive cable 36 within longitudinal bore 39.

Referring now to FIG. 6, rear window drive assembly 24 is of the type used for after market application such that housing 40 can be secured to window frame 18 which is a manually-operated type window assembly. More specifically, housing 40 is detachably secured to rear window assembly 16 by a plurality of spring clips 60 such that longitudinal bore 39 is substantially parallel to the direction of movement of slidable panes 22, 22'. Tab portions 62 of spring clip 60 are received within complementary channels 64 of housing 40. Bead portions 66 formed on spring clip 60 engage an upper and lower flange portion of window frame 18 for securing rear window drive assembly 24 to window frame 18. As presently preferred five (5) spring clips are utilized to detachably secure rear window drive assembly 24 to window frame 18, a pair of spring clips being disposed on each end thereof and a single spring clip (not shown) disposed in approximately a center portion of rear window drive assembly 24.

Referring again to FIGS. 2 and 3, drive motor assembly 28 includes drive motor 68 supported on motor mounts 70, 72 to isolate drive motor 68 from drive motor bracket 30. As presently preferred, drive motor 68 is of a fractional horsepower, direct current variety. Furthermore, drive motor 68 may include a planetary gear assembly which is not shown in this embodiment, but would be similar to planetary gear assembly 146 that is illustrated in and described in connection with FIG. 9. Nut 74 secures drive motor 68 to drive motor bracket 30. Wiring harness 76 provides power to drive motor 68 and further includes fuse assembly 78 and switch 80 for activating and de-activating drive motor assembly 28. More specifically, switch 80 is a three position switch which permits an "off" condition, as well as reversal of the polarity of the current supplied to drive motor 68 to enable forward and reverse operation in an "on" condition.

The proximal end 84 of drive cable 36 adjacent drive motor assembly 28 has a flat surface (not shown) formed thereon for engaging and cooperating with a complementary flat surface formed on motor shaft 82 extending from drive motor 68. In this manner, drive cable 36 is secured to motor shaft 82 extending from drive motor 68 at cable end 84 and held in position by tube nut 86. Spring clutch 88 is disposed on proximal cable end 84 to account for dimensional tolerances between proximal cable end 84 and motor shaft 82 so as to provide positive power transmission therebetween.

Referring now to FIG. 7, an alternate embodiment of the present invention is shown wherein the rear window drive assembly is formed integral with the window frame for use as an original equipment option by manufacturer. Many of the components for this alternate embodiment are similar or identical to those referenced and previously described with respect to FIGS. 3–6. Accordingly, identical reference numerals will be utilized to identify identical or similar components. Fixed glass 20 and slidable glass 22 are disposed within window frame 18. Housing 40 is formed integrally with window frame 18 and extends outwardly from the side opposite fixed glass 20. Drive cable 36 is disposed within a longitudinal bore formed along the longitudinal axis of housing 40 and supported therein for rotational movement. Slidable glass 22 is secured to coupling bracket 26 by coupling portion 50 which includes head 52 and pad 54 extending therefrom. Bracket portion 56 of coupling bracket 26 extends outwardly away from slidable glass 22 and engages drive cable 36. Spacer 58 is disposed within housing 40 adjacent coupling bracket 26 and helps to support coupling bracket 26 during relative movement with respect to housing 40. As described above, the rear window drive assembly of the present invention is adaptable to be included as an original equipment option by the manufacturer of the sliding window assembly or as an after market option which may be retro-fitted to an existing manually-operated sliding window assembly.

The operation of the present invention as illustrated in FIGS. 1–7 will now be described. Initially, the rear window assembly 16 is in a closed position as best shown in FIG. 2.

When it is desirable to open the window, switch 80 is activated in a first direction to energize drive motor assembly 28, thereby causing drive cable 36 to rotate in a first direction within drive cable tube 34 and housing 40. Protuberance 57 formed on bracket portion 56 of coupling bracket 26 engages left hand thread portion 38 formed by outer coil 92 of drive cable 36. Accordingly, coupling bracket 26 translates linearly toward the distal end of housing 40 in response to rotational movement of drive cable 36 in a first direction. Similarly, bracket portion 56' engages right hand thread portion 38' of drive cable 36 and translates linearly outwardly toward the proximal end of housing 40. Pads 54, 54' are secured to a bottom portion of slidable glass 22, 22' such that as coupling brackets 26, 26' translate outwardly from a center line of housing 40, slidable glass panes 22, 22' are drawn outwardly into an open position as shown in phantom illustration in FIG. 2. When it is desirable to close the window, switch 80 is activated in a second direction to energize drive motor assembly 28, thereby causing drive cable 36 to rotate in a second direction within drive cable tube 34 and housing 40. As a result, coupling brackets 26, 26' translate linearly inwardly toward the center line of housing 40 in response to rotational movement of drive cable 36 in the second direction causing slidable glass 22, 22' to be drawn inwardly into a closed position as shown in solid illustration in FIG. 2.

Figure 9:
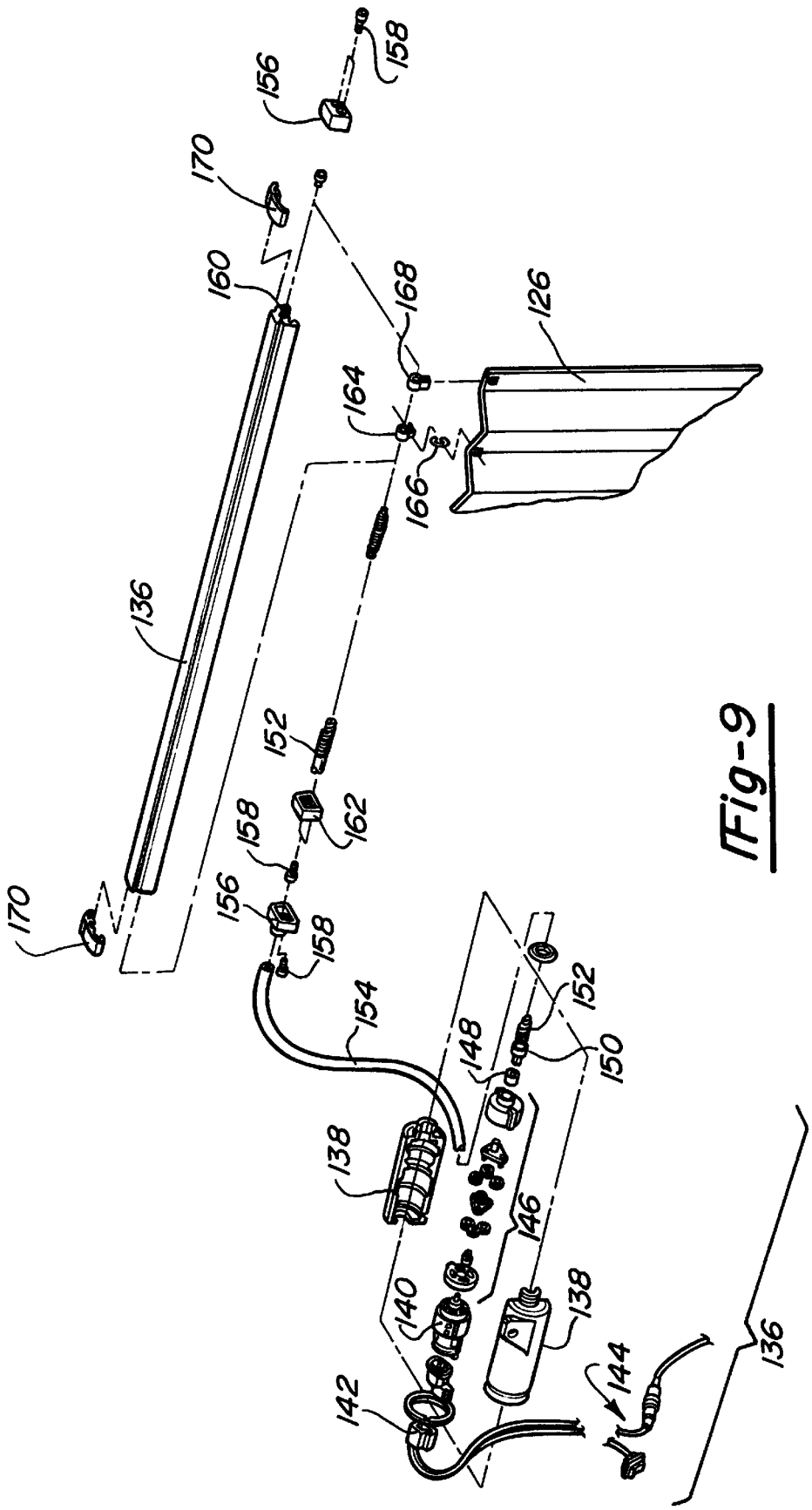
FIG. 9 is an exploded perspective view illustrating the components of the curtain drive assembly shown in FIG. 8.

Referring now to FIGS. 8 and 9, various alternate adaptations for the present invention are shown in the environment of an over-the-road truck cab 112. More specifically, truck cab 112 includes a driving portion 114 located in the forward part of cab 112 and a living portion 116 located in the rearward part of cab 112. Truck cab 112 further includes partition curtain assembly 122 dividing forward portion 114 and rearward portion 116 thereof. Partition curtain assembly 122 is positionable between an open position wherein access is readily available between the forward portion 114 and rearward portion 116, and a closed position wherein rearward portion 116 is concealed from forward portion 114. Partition curtain assembly 122 includes curtain track 124 and drive motor assembly 136 for providing power assisted operation of curtain assembly 122.

Truck cab 112 also includes sliding window assembly 118 disposed within an opening in side wall 120 of truck cab 112. Sliding window assembly 118 is similar in structure and function to rear window assembly 16 heretofore described. Accordingly, further reference can be made to description set forth above for a complete understanding of the components and operation of sliding window assembly 118.

Sliding window assembly 118 may be equipped with auxiliary curtain assembly 128 having auxiliary curtain drive assembly 130 for opening and closing of auxiliary curtain 132. In this regard, partition curtain drive assembly 124 and auxiliary curtain drive assembly 130 are substantially similar in structure and operation. Accordingly, only the components of partition curtain drive assembly 124 are illustrated and described herein.

Referring now to FIG. 9, partition curtain assembly 122 includes drive motor assembly 136 having motor housing 138 encasing electric motor 140. Electrical connector 142 detachably secures switch/fuse assembly 144 with electric motor 140. The input shift of planetary gear assembly 146 is operably coupled to the output shaft of electric motor 140 and provides for speed and torque adjustment of the output from electric motor 140. The output shaft of planetary gear assembly 146 includes drive cable coupler 148 having a bore having a square cross-section formed therein. Cable end 150 frictionally engages the proximal end of drive cable 152 and has a square spline formed on an opposite end for inserting into drive cable coupler 148 for operably coupling electric motor 140, planetary gear assembly 146 and drive cable 152. Drive cable tube 154 is interconnected between motor housing 138 and end cap 156 and receives drive cable 152 for rotational support therein. Threaded fastener 158 secures molded end cap 156 to curtain track 136.

Longitudinal bore 160 is formed in curtain truck 136 substantially parallel to the direction of movement of partition curtain 126. Bearing bracket 162 is disposed within longitudinal bore 160 formed through curtain track 136 and provides rotational support for drive cable 152 therein. Drive cable 152 extends through the length of curtain track 136 and terminates at an opposite end thereof adjacent molded end cap 156. Partition curtain 126 is hung from drive cable 152 by a plurality of curtain support hangers 164. More specifically, each support hanger has a ring portion 166 and a flange portion 168 extending downwardly therefrom. Ring portion 166 is disposed within longitudinal bore 160 and is dimensioned to surround drive cable 152 for permitting freely slidable movement of support hanger 164 on drive cable 152. Attachment clips 170 releasably secure curtain 126 to flange portion 168 of support hanger 164 to facilitate removal therefrom. An end of partition curtain 126 is hung from drive cable 152 by curtain drive hanger 172. More specifically, curtain drive hanger 172 includes ring portion 174 and flange portion 176 extending downwardly therefrom. Ring portion 174 is disposed within longitudinal bore 160 and has a protuberance, similar to protuberance 57 formed on coupling bracket 56, formed on an inner surface thereof which engages a helical surface (not shown) of drive cable 152. In this way, curtain drive hanger 172 and curtain 126 are translated linearly along curtain track 136 as drive cable 152 is rotated by drive motor assembly 136. Spring clips 170 are secured to the interior of truck cab 112 and releasably engage curtain track 136 to releasably secure partition curtain drive assembly 122 therein.

The operation of the present invention illustrated in FIGS. 8 and 9 will now be described. Initially, partition curtain assembly 122 is in an open position as best shown in FIG. 9. When it is desirable to close curtain 126, switch assembly 144 is activated in a first direction to energize drive motor assembly 136, thereby causing drive cable 152 to rotate in a first direction within drive cable tube 154 and curtain track 136. Curtain drive hanger 172 translates linearly towards the distal end of curtain track 136 in response to rotational movement of drive cable 152 in the first direction causing curtain 126 to close. When it is desirable to open the curtain, switch assembly 144 is activated in a second direction to energize drive motor assembly 136, thereby causing drive cable 152 to rotate in a second direction within drive cable tube 154 and curtain track 136. Accordingly, curtain drive hanger 172 translates linearly toward the proximal end of curtain track 136 in response to rotational movement of drive cable 152 in the second direction causing curtain 126 to open.

While it is apparent that the preferred embodiments of the present invention disclosed are well calculated to provide the advantages and features above-stated, it will be appreciated that the invention is susceptible to modifications, variations and change without departing from the proper scope or fair meaning of the subjoined claims.

I claim:

1. A drive assembly for positioning a slidable member within in a frame, the drive assembly comprising:
   a motor assembly;
   a drive housing having a longitudinal bore formed therethrough, said drive housing securable to the frame such that said longitudinal bore is substantially parallel to a direction of movement of the slidable member;

a drive cable having a first end rotatably coupled to said motor assembly and extending therefrom and a drive portion disposed within said longitudinal bore and supported for rotation in said drive housing;

a coupling bracket having a first portion securable to the slidable member and a second portion engaging said drive portion of said drive cable; and a drive interface having a helical surface formed on one of said drive portion and said second portion and a protuberance formed on another of said drive portion and said second portion, said protuberance engaging said helical surface such that rotation of said motor assembly rotates said drive portion within said longitudinal bore and axially drives said coupling bracket along said housing in said direction of movement.

2. The assembly of claim 1 wherein said drive portion of said drive cable has a helical surface thereon, said helical surface engaging said second portion of said coupling bracket.

3. The assembly of claim 2 wherein said drive cable further comprises a flexible inner core, flocking covering said inner core and an outer coil wrapping said flexible inner core and said flocking to form said helical surface.

4. The assembly of claim 2 wherein said second portion of said coupling bracket has a contoured surface formed therein which is complementary with said helical surface.

5. The assembly of claim 4 wherein said contoured surface comprises a generally V-shaped protuberance which fits within a space formed in said helical surface.

6. The assembly of claim 1 wherein said coupling bracket is tangentially positionable relative to said longitudinal bore.

7. The assembly of claim 1 further comprising a spacer disposed within said longitudinal bore adjacent said second potion of said coupling bracket.

8. The assembly of claim 1 wherein said drive cable permits said motor assembly to be remotely located from said drive housing.

9. The assembly of claim 1 wherein said motor assembly further comprises an electric motor supported on a bracket assembly and a planetary gear assembly interconnected between an output shaft of said electric motor and said first end of said drive cable.

10. The assembly of claim 1 wherein said drive housing is detachably securable to the frame.

11. The assembly of claim 1 wherein said drive housing is integrally formed with the frame.

12. A power-assisted slidable window assembly comprising:

a window frame;

a slidable window supported within and slidably positionable relative to said window frame in a first direction;

a drive housing disposed adjacent said frame and having a longitudinal bore formed through said housing substantially parallel to said first direction;

a motor assembly;

a drive cable having a first end rotatably coupled to said motor assembly and extending therefrom and a drive portion disposed within said longitudinal bore and supported for rotation in said drive housing;

a coupling bracket having a first portion securable to said slidable window and a second portion engaging said drive portion of said drive cable; and a drive interface having a helical surface formed on one of said drive portion and said second portion and a protuberance formed on another of said drive portion and said coupling bracket, said protuberance engaging said helical surface such that rotation of said motor assembly rotates said drive portion within said longitudinal bore and axially drives said coupling bracket along said housing in said first direction.

13. The assembly of claim 12 wherein said drive cable further comprises a flexible inner core, a flocking covering said inner core and an outer coil wrapping said flexible inner core and said flocking to form a helical surface.

14. The assembly of claim 13 wherein said second portion of said coupling bracket has a contoured surface formed therein which is complementary with said helical surface.

15. The assembly of claim 12 further comprising:

a first slidable window supported within and slidably positionable relative to said window frame in said first direction;

a second slidable window supported within and slidably positionable relative to said window frame in a second direction parallel to and opposite from said first direction;

a first coupling bracket having an attachment portion securable to said first slidable window and a bracket portion engaging said drive portion of said drive cable such that rotation of said motor assembly rotates said drive cable causing linear translation of said first slidable window relative to said frame in said first direction; and a second coupling bracket having an attachment portion securable to said second slidable window and a bracket portion engaging said drive portion of said drive cable such that rotation of said motor assembly rotates said drive cable causing linear translation of said second slidable window relative to said frame in said second direction.

16. The assembly of claim 15 wherein said drive portion of said drive cable comprises a first drive portion engaging said bracket portion of said first coupling bracket and a second drive portion engaging said bracket portion of said second coupling bracket.

17. The assembly of claim 16 wherein said drive cable further comprises a flexible inner core, a flocked covering extending from said inner core and a first outer coil wrapping a portion of said flexible inner core and said flocking to form a first helical surface forming said first drive portion and a second outer coil wrapping a portion of said flexible inner core and said flocking to form a second helical surface.

18. The assembly of claim 17 wherein said bracket portion of each of said first and second coupling brackets further comprises a contoured surface which is complementary with each of said first and second helical surfaces.

19. In combination a slidable member and a powered drive assembly therefor comprising:

a track having a longitudinal bore formed therethrough;

a slidable member slidably positionable along said track in a first direction;

a motor assembly;

a drive cable having a first end rotatably coupled to said motor assembly and extending therefrom and a drive portion disposed within said longitudinal bore and supported for rotation in said track;

a coupling bracket having a first portion secured to said slidable member and a second portion engaging said drive portion of said drive cable; and a drive interface having a helical surface formed on one of said drive portion and said second portion and a protuberance formed on another of said drive portion and said coupling bracket, said protuberance engaging said helical surface such that rotation of said motor assembly rotates said drive portion within said longitudinal bore and axially drives said coupling bracket along said track in said first direction.

20. A drive assembly for positioning a slidable member within a frame, the drive assembly comprising:

a motor assembly;

a drive housing having a longitudinal bore formed therethrough, said drive housing securable to the frame such that said longitudinal bore is substantially parallel to a direction of movement of said slidable member;

a drive cable having a first end rotatably coupled to said motor assembly and extending therefrom and a drive portion disposed within said longitudinal bore and supported by said drive housing, said drive cable further including a flexible inner core, flocking covering said inner core and an outer coil wrapping said flexible inner core and said flocking to form a helical surface;

a coupling bracket having a first portion securable to the slidable member and a second portion engaging said helical surface such that rotation of said motor assembly rotates said drive cable causing linear translation of said coupling bracket along said housing.

21. The assembly of claim 20 wherein said second portion of said coupling bracket has a contoured surface formed therein which is complementary with said helical surface.

22. The assembly of claim 21 wherein said contoured surface comprises a generally V-shaped protuberance which fits within a space formed in said helical surface.

23. The assembly of claim 20 wherein said coupling bracket is tangentially positionable relative to said longitudinal bore.

24. The assembly of claim 20 further comprising a spacer disposed within said longitudinal bore adjacent said second potion of said coupling bracket.

25. The assembly of claim 20 wherein said drive cable permits said motor assembly to be remotely located from said drive housing.

26. The assembly of claim 20 wherein said motor assembly further comprises an electric motor supported on a bracket assembly and a planetary gear assembly interconnected between an output shaft of said electric motor and said first end of said drive cable.

* * * * *

UNITED STATES PATENT AND TRADEMARK OFFICE
CERTIFICATE OF CORRECTION

PATENT NO. : 6,038,819
DATED : March 21, 2000
INVENTOR(S) : George W. Klein

It is certified that error appears in the above-identified patent and that said Letters Patent is hereby corrected as shown below:

Column 2, line 43, "appreciate" should be -- appreciated --.

Column 2, line 56, "183" should be -- 18 --.

Column 3, line 38, "Is" should be -- is --.

Column 5, line 61, "shift" should be -- shaft --.

Column 6, line 64, delete "in".

Column 7, line 36, "potion" should be -- portion --.

Column 10, line 14, after "potion" should be -- portion --.

Signed and Sealed this

Third Day of April, 2001

Attest:

NICHOLAS P. GODICI

*Attesting Officer*   Acting Director of the United States Patent and Trademark Office